Patented Sept. 3, 1946

2,406,954

UNITED STATES PATENT OFFICE 2,406,954

ALKYLATION OF ISOPARAFFINIC HYDROCARBONS

Carl B. Linn, Riverside, Ill., assignor to Universal Oil Products Company, Chicago, Ill., a corporation of Delaware No Drawing. Application September 20, 1943, Serial No. 503,105

8 Claims. (Cl. 260—683.4)

This application is a continuation-in-part of my co-pending application Serial No. 424,783, filed December 29, 1941.

This invention relates to a process involving the treatment of isoparaffinic hydrocarbons, both gaseous and liquid, to produce therefrom branched chain paraffinic hydrocarbons of higher molecular weight. In a more specific sense this invention is concerned with a novel process for alkylating isoparaffinic hydrocarbons comprising isobutane and relatively low-boiling normally liquid isoparaffins with gaseous or liquid olefins to produce normally liquid saturated hydrocarbons which may be utilized as components of gasoline suitable for use in airplane and automobile engines.

These isoparaffinic and olefinic hydrocarbons have been utilized in alkylation reactions in the presence of hydrogen fluoride alone or of hydrogen fluoride diluted with relatively small quantities of water. The present type of catalyst is a marked improvement over previous catalysts containing hydrogen fluoride in that the activity of the catalytic material may be controlled more accurately by proper dilution with non-aqueous substances which are relatively inert catalytically but which have substantial solubilities in liquid hydrogen fluoride.

Broadly, the invention relates to the use of a hydrogen fluoride alkylation catalyst which contains dissolved therein at least one fluoride or oxyfluoride having a boiling point below about 300° C.

In one specific embodiment the present invention comprises the alkylation of isoparaffinic hydrocarbons with olefinic hydrocarbons in the presence of a catalyst comprising essentially a major proportion of hydrogen fluoride and a relatively minor proportion of an inorganic compound which is soluble in said hydrogen fluoride and which has a boiling point below 300° C., said inorganic compound being selected from the group consisting of the fluorides and oxyfluorides of sulfur, selenium, nitrogen, phosphorus, molybdenum, titanium, tungsten, vanadium, and silicon.

A feature of the present invention is the dilution of substantially anhydrous hydrogen fluoride with a non-aqueous diluent so that the ordinarily vigorous reaction of anhydrous hydrogen fluoride on catalytic condensation reactions among hydrocarbons is moderated to the extent that reactions of alkylation occur in preference to other less desirable reactions. Alkylation is essentially a complex reaction since the simple union of paraffinic and olefinic molecules to give the so-called primary reaction product is accompanied by many side reactions among which are decomposition or cracking reactions and isomerization which under certain conditions can change a substantial proportion of the primary product such as iso-octanes into a mixture of isomers of lower and higher boiling hydrocarbons frequently of lower antiknock value. Accordingly, the present invention deals with the modification of a hydrogen fluoride alkylation catalyst by the addition thereto of certain inorganic compounds which have substantial solubilities therein and which moderate the action of this catalyst in such a way as to improve the yield and quality of the hydrocarbon alkylation product.

According to the process of the present invention, isoparaffins are contacted with olefins in the presence of a catalyst consisting of a major proportion by weight of liquid hydrogen fluoride and a relatively minor proportion by weight of a low boiling fluoride or oxyfluoride which is soluble in said hydrogen fluoride. The term isoparaffin is herein used broadly to include all alkylatable branched chain paraffins. The reaction of the present process is effected under controlled conditions of temperature and pressure until the olefins have been substantially consumed and a substantially saturated hydrocarbon product is formed which boils within the boiling range of gasoline.

Isobutane is the isoparaffin commonly subjected to alkylation although higher molecular weight isoparaffins may also be reacted with olefins under similar or modified conditions of operations to produce branched chain paraffins of higher boiling point than the isoparaffins charged to the process. However, as the higher molecular weight isoparaffins such as isopentane, isohexane, etc., are themselves valuable constituents of gasoline, they are consequently used less commonly as charging stocks for the alkylation process than is isobutane. Mono-olefins, and particularly those containing from 3 to about 16 carbon atoms per molecule, are utilizable for alkylating isoparaffins in the presence of a mixture of hydrogen fluoride and a diluent or spacing agent as herein described, although the common olefin-containing charging stocks are often limited to hydrocarbon fractions containing propene and butenes and certain amounts of ethylene. Normal paraffins frequently present in hydrocarbon fractions containing propene and butenes dilute the reacting hydrocarbons but are separable from the alkylation products by distillation. Thus, propane and normal butane may be removed from the alkylation product, while an isoparaffin such as isobutane, which is also separated from the reaction product, is recycled to further alkylation treatment.

In order to favor the alkylation reaction rather than olefin polymerization, the hydrocarbon charging stock including the isoparaffin and added olefin-containing fraction may be commingled with recycled isoparaffin so that the ratio of isoparaffin to olefin in the total hydrocarbon mixture charged to the alkylation zone is approximately 5:1. In some cases this ratio may be as low as about 1:1 or as high as 10:1, or more, the exact ratio being somewhat dependent upon the particular isoparaffin and olefin or olefin-containing mixture charged.

The amount of hydrogen fluoride-containing catalyst employed is preferably from about 10 to about 100 parts by weight of catalyst per 100 parts by weight of hydrocarbons undergoing treatment at any one time, although in some operations other ratios of catalyst to hydrocarbons may be used. The concentrations of hydrogen fluoride in the composite catalysts which I have found desirable are limited by the solubilities in liquid hydrogen fluoride of the compound or compounds chosen as catalyst diluents or spacing agents. Depending upon the reactivity of the hydrocarbon components in a given alkylation reaction, hydrogen fluoride of different concentrations and different proportions of hydrogen fluoride and diluents may be employed to form active alkylating catalysts.

Alkylation reaction temperatures between about 0° and about 50° C. are preferred, although satisfactory results may be obtained at temperatures as low as about −30° and as high as about +100° C. when reacting isoparaffins with olefins in the presence of a mixture of hydrogen fluoride and a spacing agent as herein described. As additional means of regulation of the upper limits of temperature, the proportions of hydrogen fluoride and diluent may be varied to produce good results provided they are co-ordinated properly with the reaction temperature and rate of charge of the isoparaffin and olefin hydrocarbons. For instance, the reaction of isobutane with propene may require more severe conditions such as a somewhat higher temperature, a longer time of contact, or a catalyst containing a higher proportion of hydrogen fluoride to diluent than that used for catalyzing the reaction of isobutane with the more reactive isobutene. Superatmospheric pressure, generally not in excess of about 20 atmospheres, is employed to assist the reaction and to prevent undue loss of the reactants and catalyst by vaporization and, when desirable, to maintain the hydrocarbons and catalyst in substantially liquid state or to effect liquefaction of a portion of the reaction mixture.

The spacing agents or diluents which are employed in the present invention are inorganic fluorides and oxyfluorides which are soluble to a substantial extent in liquid hydrogen fluoride and which boil below about 300° C. The preferred compounds are the low boiling fluorides and oxyfluorides of sulfur, selenium, nitrogen, phosphorus, molybdenum, titanium, tungsten, vanadium, and silicon. Of the last named compounds the fluorides and oxyfluorides of silicon are most readily obtained, particularly silicon tetrafluoride. Most of these fluorides and oxyfluorides are normally gaseous compounds but are soluble to a useful extent in hydrogen fluoride. A few of the compounds are liquids or solids at ordinary temperatures and pressures. A tabulation of the principal inorganic compounds of this class and their physical properties is presented as follows:

| Compound | Melting point, °C. | Boiling point, °C. |
|---|---|---|
| $SF_6$ | [1] −55 | −63.5 |
| $S_2F_2$ | −105.5 | −99 |
| $SOF_2$ | −110 | −30 |
| $SO_2F_2$ | [2] −120 | −52 |
| $SeF_4$ | −80 | 100 |
| $SeF_6$ | −39 | −34.5 |
| $SeOF_2$ | 4.6 | 124 |
| $NOF$ | −134 | −56 |
| $NO_2F$ | −139 | −63.5 |
| $POF_3$ | −68 | −40 |
| $PF_3$ | −160 | −95 |
| $PF_5$ | −83 | −75 |
| $MoF_6$ | 17 | 35 |
| $MoOF_4$ | 98 | 180 |
| $TiF_4$ | | 284 |
| $WF_6$ | 2.5 | 19.5 |
| $WOF_4$ | 110 | 185–190 |
| $VF_5$ | | 111.2 |
| $VOF_2$ | | |
| $SiF_4$ | −77 | −65 |

[1] Under pressure.
[2] 65 mm. pressure.

From the statements hereinabove set forth concerning the types of inorganic compounds which may be employed as diluting or spacing materials for hydrogen fluoride, it will be evident that a large number of catalyst composites of varying compositions may be made according to the needs of different alkylation reactions. However, the different diluents or spacing agents are not necessarily equivalent in their action.

While in most cases the activity of the alkylating composite employed is due principally to the hydrogen fluoride, it is recognized that the inorganic compounds added thereto may at times exert a definite chemical influence upon the reactions other than merely moderating the effect of the hydrogen fluoride. It is also evident that the selection of any particular compound or mixture of compounds for use with hydrogen fluoride is determined by solubility relations, the moderating effect of said compound on the activity of this catalyst utilized in the alkylation of the isoparaffinic hydrocarbons involved, the general operating conditions, and the matter of economy in the cost of the reagents.

The process of the present invention is carried out in either batch or continuous types of operation. In a simple batch type process, an isoparaffin to be alkylated such as isobutane, is brought to the alkylating temperature within the approximate range specified and in the presence of the necessary amount of catalyst mixture comprising liquid hydrogen fluoride and spacing agent, and alkylation is effected by the gradual introduction of an olefin, or preferably of an olefin-isoparaffin mixture, under the surface of the liquid catalyst which is stirred mechanically to effect intimate contact between the catalyst and the reacting hydrocarbons and to delay the settling-out and separation of the catalyst which is heavier than the liquid hydrocarbon mixture. Alkylation may be allowed to progress to different stages of reaction. In the case of the alkylation of isobutane by propene or butenes, good products from the standpoint of high antiknock gasoline are produced usually by maintaining at all times in the reaction zone a molar excess of isoparaffin to olefin. The presence of such an excess of isoparaffins, generally at least 2 molecular proportions of isoparaffin per molecular proportion of olefin, tends to minimize undesirable polymerization reactions. The mixture of alkylation products and catalyst composite is removed periodically from the batch type process and separated into a hydrocarbon layer and a catalyst layer, the latter being returned to the reaction zone for further use while the hydrocarbon layer is fractionally distilled to separate therefrom the gasoline fraction and the excess of the isoparaffin originally charged to the process. The excess isoparaffin may be reacted further with an olefin in a subsequent alkylation treatment in the alkylation zone of the process.

It is usually preferable to carry out the alkylation reaction on a continuous basis by withdrawing from the alkylation reactor a mixture of excess unreacted isoparaffins and admixed normal paraffins, an alkylate of gasoline boiling range, higher boiling hydrocarbons, and catalyst composite, said mixture being withdrawn at substantially the same rate as that at which the fresh hydrocarbon charging stock and catalyst are supplied to the alkylation reactor. In order to keep low the competing olefin polymerization reaction, the molar ratio of isoparaffins to olefins in the alkylating zone is kept relatively high throughout the entire reaction. The ratio of isoparaffin to olefin is subject to some variation and is affected considerably by the method of introducing the olefin-containing fraction and by the efficiency of mixing. As the process is usually operated, sufficient pressure is maintained upon the reaction mixture to keep a substantial proportion thereof in liquid state. The exact pressure necessary depends both upon the composition of the reaction mixture and the temperature employed. The alkylation reactor used in the process consists quite often of a coil or tower provided with baffles, orifice plates, or other mixing devices, or a vessel provided with a stirrer or other mechanical means of agitation although any method may be employed that satisfactorily effects intimate contact of the reacting hydrocarbons and mixture of catalyst and spacing agent employed.

The following example is given to indicate results obtainable by the use of the present process, although it is not intended to limit the scope of the invention in exact correspondence with the example.

A mixture of 392 grams of anhydrous liquid hydrogen fluoride and 8 grams of silicon tetrafluoride is charged to a steel autoclave of approximately 5000 c. c. capacity equipped with a pressure-sealed stirring device. The autoclave is maintained at approximately 38° C. by immersion in a cooling bath of appropriate temperature and 3000 c. c. of a liquid mixture, consisting of isobutane and normal butene in the ratio of 3 molecular proportions of isobutane and 1 molecular proportion of normal butene, is introduced continuously to the autoclave over a period of two hours while the reaction mixture in the autoclave is stirred mechanically. After completing the addition to the autoclave of the mixture of isobutane and normal butene, the stirring is stopped, the hydrocarbon layer is separated from the hydrogen fluoride-containing catalyst layer, the latter being returned to further use in another run. The hydrocarbon layer is debutanized, washed with water and caustic soda solution to remove dissolved hydrogen fluoride, dried, and distilled to separate therefrom a substantially saturated fraction of gasoline boiling range containing a relatively high proportion of branched chain octanes. The isobutane recovered in the debutanization of the alkylation product is returned to further contact with normal butenes and a mixture of fresh and used catalyst to produce a further quantity of alkylation product.

From 3000 c. c. (approximately 1700 grams) of the isobutane-normal butene mixture treated there is obtained approximately 850 grams of water-white, normally liquid, saturated hydrocarbons containing less than 0.001% by weight of organically combined fluorine and having an end-boiling point of 450° F. The resulting normally liquid hydrocarbons are equivalent to approximately 200% by weight of the butenes charged to the process. 90% of the liquid hydrocarbon products boil below 300° F. and are thus in the boiling range of aviation gasoline. The aviation gasoline fraction has an A. S. T. M. octane number of 93.

I claim as my invention:

1. An alkylation process which comprises reacting an isoparaffin with an olefin in the presence of a liquid hydrogen fluoride catalyst having dissolved therein a minor proportion of an inorganic compound soluble in liquid hydrogen fluoride and boiling below about 300° C., said inorganic compound being selected from the group consisting of the fluorides and oxyfluorides of sulfur, selenium, nitrogen, phosphorus, molybdenum, titanium, tungsten, vanadium, and silicon.

2. An alkylation process which comprises reacting an isoparaffin with an olefin in the presence of a liquid hydrogen fluoride catalyst having dissolved therein a minor proportion of silicon tetrafluoride.

3. A process for the synthesis of saturated gasoline boiling range hydrocarbons which comprises reacting an isoparaffin with an olefin under alkylating conditions in the presence of a catalyst comprising essentially a major proportion by weight of liquid hydrogen fluoride and a relatively minor proportion of an inorganic compound soluble in liquid hydrogen fluoride and boiling below about 300° C., said inorganic compound being selected from the group consisting of the fluorides and oxyfluorides of sulfur, selenium, nitrogen, phosphorus, molybdenum, titanium, tungsten, vanadium, and silicon.

4. An alkylation process which comprises reacting an isoparaffinic hydrocarbon with an olefinic hydrocarbon at a temperature of from about −30° C. to about 100° C. in the presence of a catalyst comprising essentially a major proportion by weight of liquid hydrogen fluoride and a relatively minor proportion by weight of an inorganic compound soluble in liquid hydrogen fluoride and boiling below about 300° C., said inorganic compound being selected from the group consisting of the fluorides and oxyfluorides of sulfur, selenium, nitrogen, phosphorus, molybdenum, titanium, tungsten, vanadium, and silicon.

5. An alkylation process which comprises reacting an isoparaffinic hydrocarbon with an olefinic hydrocarbon at a temperature of from about −30° C. to about 100° C. in the presence of a catalyst comprising essentially a major proportion by weight of liquid hydrogen fluoride and a relatively minor proportion by weight of an inorganic compound which is soluble in said hydrogen fluoride and boils below about 300° C., said inorganic compound being selected from the group consisting of the fluorides and oxyfluorides of sulfur, selenium, nitrogen, phosphorus, molybdenum, titanium, tungsten, vanadium, and silicon and the pressure in the alkylation zone being sufficient to maintain the reacting hydrocarbons and catalyst in substantially the liquid phase.

6. An alkylation process which comprises contacting a molar excess of an isoparaffinic hydrocarbon with an olefinic hydrocarbon at a temperature of from about −30° C. to about 100° C. in the presence of a catalyst comprising essentially a major proportion by weight of liquid hydrogen fluoride and a relatively minor proportion by weight of an inorganic compound soluble in liquid hydrogen fluoride and boiling below about 300° C., said inorganic compound being selected from the group consisting of the fluorides and oxyfluorides of sulfur, selenium, nitrogen, phosphorus, molybdenum, titanium, tungsten, vanadium, and silicon and the pressure in the alkylation zone being sufficient to maintain the reacting hydrocarbons and catalyst in substantially the liquid phase.

7. An alkylation process which comprises reacting isobutane with a mono-olefin in the presence of a liquid hydrogen fluoride catalyst having dissolved therein a minor proportion of an inorganic compound soluble in liquid hydrogen fluoride and boiling below about 300° C., said inorganic compound being selected from the group consisting of the fluorides and oxyfluorides of sulfur, selenium, nitrogen, phosphorus, molybdenum, titanium, tungsten, vanadium, and silicon.

8. The process of claim 7 wherein said inorganic compound comprises silicon tetrafluoride.

CARL B. LINN.